United States Patent [19]

Matsuura et al.

[11] 4,012,899
[45] Mar. 22, 1977

[54] MICRO MOTOR FOR A TIMEPIECE

[75] Inventors: Eiichi Matsuura, Chiba; Nobuo Tsukada, Tokyo, both of Japan

[73] Assignee: Kabushiki Kaisha Daini Seikosha, Japan

[22] Filed: Apr. 9, 1975

[21] Appl. No.: 566,348

[30] Foreign Application Priority Data

Apr. 9, 1974 Japan .............................. 49-40344
Apr. 23, 1974 Japan .............................. 49-45789

[52] U.S. Cl. .......................... 58/23 D; 310/40 MM;
58/23 R
[51] Int. Cl.² .......................................... G04C 3/00
[58] Field of Search .... 310/162, 163, 164, 40 MM, 310/254; 58/23 R, 23 D

[56] References Cited
UNITED STATES PATENTS

| | | | |
|---|---|---|---|
| 746,903 | 12/1903 | Uytenbogaart | 310/163 X |
| 1,955,588 | 4/1934 | Knopp | 310/163 |
| 1,992,826 | 2/1935 | Karasawa | 310/163 |
| 2,155,266 | 4/1939 | Hansen et al. | 310/163 |
| 2,793,307 | 5/1957 | Gallagher | 310/164 |
| 3,403,272 | 9/1968 | Dold | 310/162 X |

*Primary Examiner*—Ulysses Weldon
*Attorney, Agent, or Firm*—Robert E. Burns; Emmanuel J. Lobato; Bruce L. Adams

[57] ABSTRACT

A micro motor for a timepiece comprises a curved magnetic core, a coil winding wound on the magnetic core, a stator connected to the magnetic core to define therewith a closed magnetic flux path and having an opening therein in which a rotor is rotatably disposed. The stator comprises a pair of stator pieces each connected at one end to a respective end portion of the curved magnetic core and the stator pieces have curved portions extending at least partly along the curvature of said curved magnetic core to thereby form a compact overall assembly.

3 Claims, 5 Drawing Figures

U.S. Patent   Mar. 22, 1977   Sheet 2 of 2   4,012,899
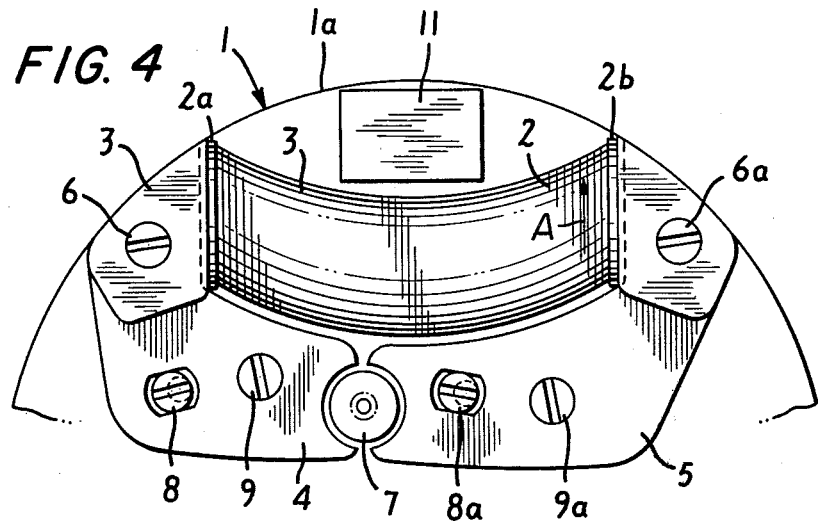
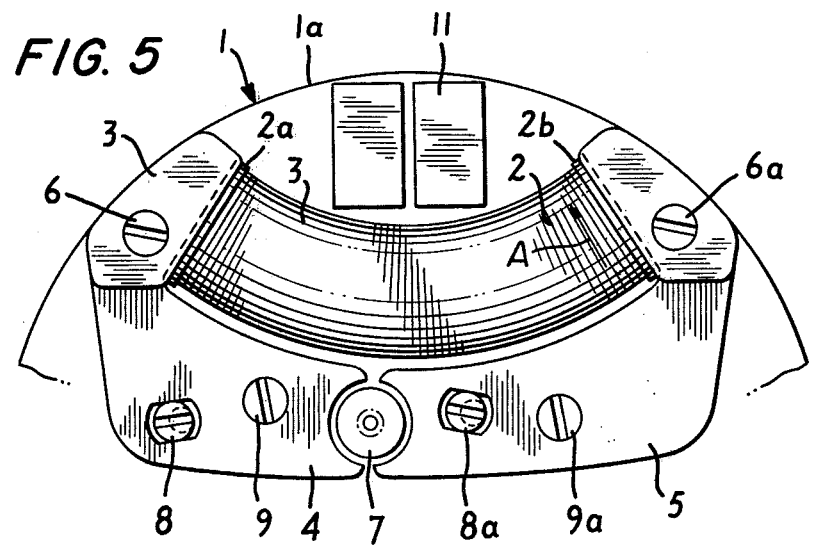

MICRO MOTOR FOR A TIMEPIECE

BACKGROUND OF THE INVENTION

This invention relates to a micro motor for an electronic timepiece, and having a core member which has a coil winding, a movement, and wherein the core member is curved along the curved outer shape of said movement.

In the conventional type timepiece motor as indicated in FIG. 1, the core member C has a coil winding wound thereon and is constructed in a straight shape. Since the outer periphery of the timepiece movement M is curved, a cavity portion SP exists between said outer periphery portion and said core member C. It has proven very difficult to effectively use said cavity portion SP, because it is very irregular and narrow in shape.

Further, the space for housing the micro motor is restricted and obstructs the performance of the transducer.

OBJECT OF THE INVENTION

The present invention aims at eliminating the above noted difficulty and insufficiency, and therefore it is the primary object of the present invention to provide a micro motor for an electronic timepiece and which has a core member having a coil winding wound thereon and which is curved along the curved outer shape of the timepiece movement.

Further object of this invention are to provide a small watch employing such a micro motor, and to obtain a high performance of said micro motor.

SUMMARY OF THE INVENTION

According to the present invention, a micro motor for an electronic timepiece and the like comprises a core member which has a coil winding, a rotor rotatably positioned between a pair of stators, and a movement which includes a gear train. The core member is curved outwardly along the curved outer shape of said movement, or inwardly away from the curved outer periphery of the movement thereby obtaining a small, compact timepiece.

BRIEF DESCRIPTION OF THE DRAWINGS

The above and other advantages of the present invention will become more obvious from the following description when taken in connection with the accompanying drawings which show the preferred embodiments of the invention, and wherein.

DETAILED DESCRIPTION OF THE INVENTION

Figure 1:
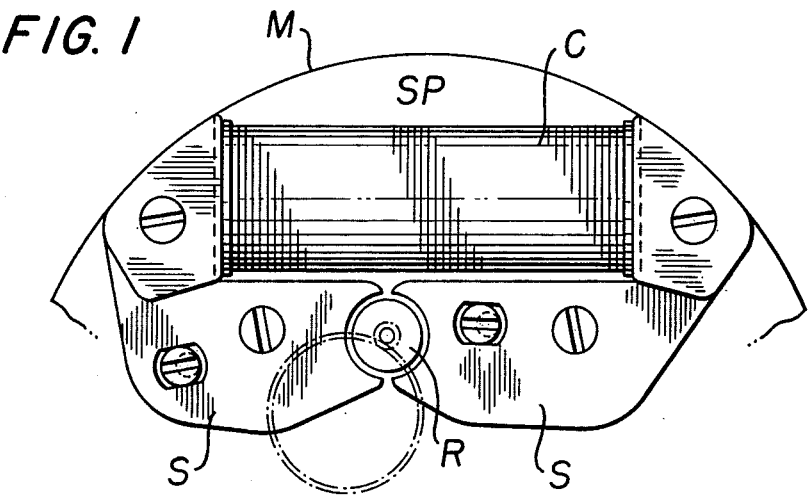
FIG. 1 shows a flat plan view of the micro motor of conventional type.
Figure 2:
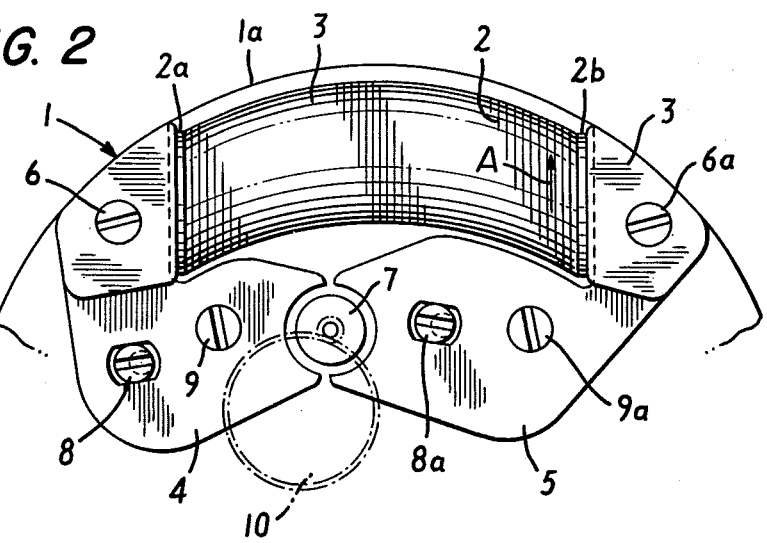
FIG. 2 shows a flat plan view of one embodiment of the micro motor of the present invention.

Referring now to the accompanying drawings, FIG. 2 shows the first embodiment of a micro motor. An outer periphery 1a of a timepiece movement 1 is shaped to a curved shape, a magnetic core member 3 which has a coil winding 2 is constructed by winding the coil to said core member 3 in a winding direction A. Said core member 3 is curved along the outer periphery 1a of said movement 1 such that no space or empty area exists between said outer periphery 1a and said core member 3. The flange portions 2a and 2b of said core member 3 are disposed in parallel relation to each other and the winding direction A of said coil 2 is parallel with said flange portion 2a. Therefore, since the winding direction is same to the conventional type of the core member of the straight shape, and it is very useful that the winding operation is very easy and the winding shape of said coil 2 is aligned to be the same between the inner side and the outer side.

Numerals 6 and 6a denote the screw bolts for coupling said core member 3 to said stators 4 and 5, numeral 7 is a rotor which is rotatably mounted in an opening formed between the curved ends of the stators, numeral 8 and 8a are the eccentric pins for adjusting the air gap of said stators 4 and 5 relative to said rotor 7, numeral 9 and 9a are the mounting screw bolts of said stators 4 and 5, and numeral 10 is a gear wheel which is geared to a pinion of said rotor 7.

Figure 3:
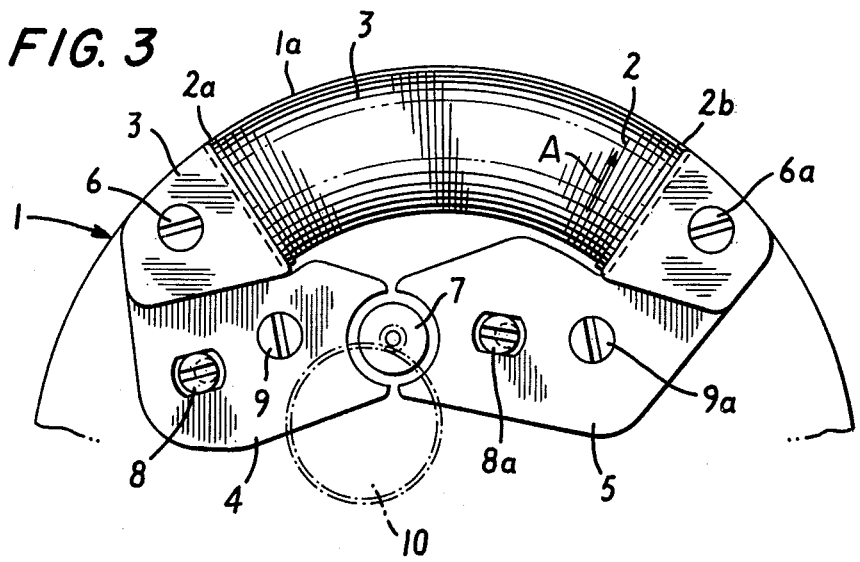
FIG. 3 shows a flat plan view of another embodiment of the micro motor of the present invention, and FIG. 4 and FIG. 5 respectively show the other embodiments of the micro motor of the present invention.

Referring now to the second embodiment of the present invention in FIG. 3, an outer periphery 1a of a movement 1 is shaped to a curved shape, a magnetic core member 3 which has a coil winding 2 is constructed by winding the coil to said core member 3 in a winding direction A. Said core member 3 is curved along the outer periphery 1a of said movement 1 as shown in FIG. 3, and it is clear that no space or area exists between said outer periphery 1a and said core member 3.

The flange portions 2a and 2b of said core member 3 and the winding direction A in said core member in FIG. 3 are set in the normal line direction to the curved line of said movement 1. It is very useful that the winding operation is very easy and the coil shape is easily stabilized, further the shape of the coupling portion in said core member 3 and the stators 4 and 5 are effectively used along the flow of the magnetic flux.

Numerals 6 and 6a are the screw bolts for coupling said core member 3 to said stators 4 and 5, numeral 7 is a rotor which is rotatably mounted in an opening formed between the carved ends of the stators, numerals 8 and 8a are an eccentric pins for adjusting the air gap of said stators 4 and 5 relative to said rotor 7, numerals 9 and 9a are the mounting screw bolts of said stators 4 and 5, and numeral 10 is a gear wheel which gears to a pinion of said rotor 7.

Since said core member 3 which has the coil winding 2 is curved along the curved outer periphery of said movement 1, the maximum space of said movement is effectively utilized.

Referring now to the third embodiment of the micro motor of the present invention, in FIG. 4 and FIG. 5, an outer periphery 1a of a movement 1 is shaped to a curved shape, a magnetic core member 3 which has a coil winding 2 is constructed by winding the coil to said core member 3 in the winding direction A. Said core member 3 is curved inwardly towards the center of said movement 1. A space or area 1b exists between said outer periphery 1a and said core member 3. The flange portions 2a and 2a of said core member 3 are disposed in parallel relation to each other and further the winding direction A of said coil 2 is parallel with said flange portion 2a. Therefore, since the winding direction is the same as with the conventional type of core member of straight shape, the winding operation is very easy and the winding shape of said coil 2 is aligned to be the same between the inner side and the outer side. Since said flange 2a and said winding direction A in said core member 3 in FIG. 5 are set in the normal line direction to that curved line of said core member 3, the winding operation is very easy and the coil shape is easily stabilized and further the shape of the coupling portion in said core member 3 and the stators 4 and 5 are effectively used along the magnetic flow of the flux.

Numerals 6 and 6a are the coupling screw bolts for coupling said core 3 and said stators 4 and 5, numeral 7 is a rotor which is rotatably mounted to said movement in an opening formed between the curved ends of the stators, numerals 8 and 8a are the eccentric pins for adjusting the air gap of said stators 4 and 5 to said rotor 7, numerals 9 and 9a are the mounting screw bolts of said stators 4 and 5, and numeral 11 is a timepiece component, for example, an electrical element such as condenser, which is disposed in the space or area 1b.

Since said space 1b is formed by said core member 3 which is curved towards the center of said movement such that the core has a curvature opposite that of the curved periphery of the movement frame, a space remains between the periphery of the movement and the core and in which may be mounted other timepiece components.

Furthermore, in FIG. 5, said flange portions 2a and 2b of said core member 3 are disposed in non-parallel relation to each other, and said electrical element 11 is positioned in said space 1b.

Since said electrical element such as the condenser is housed within said space 1b, therefore the blockform of said electrical element is speedily attained and the realization of the small watch may be realized.

What we claim is:

1. In a timepiece having a timepiece movement having an outwardly curved frame portion: a micro motor comprising a curved magnetic core mounted on the timepiece movement frame portion at the periphery thereof and being curved inwardly in a direction opposite to the outward curvature of said frame portion to define a space between the outwardly curved frame portion and inwardly curved magnetic core, a coil winding wound on said curved magnetic core, a stator comprised of stator pieces each connected at one end to a respective end portion of said curved magnetic core to define therewith a magnetic flux path and having their other ends spaced apart and configured so as to form an opening therebetween, said stator pieces having curved portions extending at least partly along the curvature of said curved magnetic core on the side opposite that which defines said space, and a rotor rotatably disposed in said opening; and at least one timepiece component mounted on said timepiece movement within said space thereby conserving space and providing a compact construction.

2. A timepiece according to claim 1; wherein the end portions of said curved magnetic core have flange portions disposed in parallel relationship with one another.

3. A timepiece according to claim 1; wherein the end portions of said curved magnetic core have flange portions disposed in non-parallel relationship with one another.

* * * * *